United States Patent [19]

Pollard

[11] Patent Number: 4,518,728
[45] Date of Patent: May 21, 1985

[54] CARBON BLACK FILLED NYLONS MODIFIED FOR IMPROVED TOUGHNESS

[75] Inventor: Robert E. Pollard, Pensacola, Fla.

[73] Assignee: Monsanto Company, St. Louis, Mo.

[21] Appl. No.: 596,795

[22] Filed: Apr. 4, 1984

[51] Int. Cl.³ ............................................. C08K 5/16
[52] U.S. Cl. ...................................... 524/88; 524/606
[58] Field of Search ................................ 524/88, 606

[56] References Cited

U.S. PATENT DOCUMENTS

| 3,368,992 | 2/1968 | Altermatt | 524/88 |
| 3,565,910 | 2/1971 | Elbert et al. | 524/88 |
| 4,208,318 | 6/1981 | Ono et al. | 524/88 |

FOREIGN PATENT DOCUMENTS

| 51-44220 | 11/1976 | Japan. | |
| 51-137795 | 11/1976 | Japan. | |
| 52-55724 | 5/1977 | Japan | 524/88 |

Primary Examiner—Lewis T. Jacobs
Attorney, Agent, or Firm—Linda L. Lewis; Michael C. Schiffer

[57] ABSTRACT

A molding composition comprising: (1) a polyamide resin; (2) a maximum of 10 percent by weight of the composition of carbon black; and (3) a maximum of less than about 20 percent by weight of the carbon black of a copper phthalocyanine pigment.

16 Claims, No Drawings

CARBON BLACK FILLED NYLONS MODIFIED FOR IMPROVED TOUGHNESS

FIELD OF THE INVENTION

The present invention relates to polyamide molding compositions. Specifically, the present invention relates to polyamide molding compositions containing carbon black and copper phthalocyanine pigment wherein the copper phthalocyanine pigment loading is less than about 200 percent by weight of the carbon black present and method of making the same.

DESCRIPTION OF THE PRIOR ART

Molded parts produced from polyamide molding compositions exhibit high toughness properties. The use of polyamide molding compositions also insures predictable dimensions of parts molded therefrom in that the degree of part shrinkage is reproducibly constant even though polyamides exhibit generally high shrinkage. Furthermore, polyamide molding compositions exhibit minimal flashing during molding operations which reduces molding difficulty in the use of injection molding methods. Thus, polyamide molding compositions are useful for many applications.

It is sometimes desirous to produce black moldings using polyamide molding compositions by the incorporation of carbon black colorants into the polyamide compositions. However, the mixture of carbon black into polyamide compositions results in molded parts exhibiting reduced toughness. The addition of carbon black also reduces dimensional predictability of shrinkage in the molded part. This diminished toughness and dimensional predictability reduces the usefulness of carbon black loaded polyamide compositions.

The use of certain types of fillers may eliminate some of the drawbacks caused by the reduced toughness and dimensional predictability. One means for counteracting the inherent loss of toughness and dimensional predictability with carbon black filled polyamides is by using nigrosine dye in conjunction with the carbon black as disclosed in U.S. Pat. No. 4,391,936.

Other pigments have heretofore been blended into polyamide compositions and have been used in conjunction with carbon black so as to color the polyamide composition, but none have been disclosed to counteract the loss in toughness caused by the use of carbon black and are typically provided at high ratios with respect to the amount of carbon black used.

U.S. Pat. No. 4,208,318, discloses the use of sulfonamide-substituted metal phthalocyanine pigment with carbon black for coloring thermoplastics in order to reduce the reddish hue achieved when only carbon black is used.

The use of copper phthalocyanine and lead chromate in conjunction with carbon black as a pigment for nylon is disclosed in U.S. Pat. No. 3,565,910. The ratio of the copper phthalocyanine pigment to carbon black is also high.

The use of a phthalocyanine pigment with carbon black in polyesters is disclosed in Japanese Patent Publication Nos. 44220/76 and 137795/76.

SUMMARY OF THE PRESENT INVENTION

The present invention is a polyamide molding composition which contains a maximum of 10 percent by weight of carbon black and a maximum of less than about 200 percent by weight of the carbon black of copper phthalocyanine pigment. Moldings made from the composition of the present invention exhibit improved toughness performance in comparison to prior art molded polyamide compositions filled with carbon black alone. Preferably, the copper phthalocyanine pigment utilized is either of the $\alpha$ or $\beta$ crystalline form.

DESCRIPTION OF PREFERRED EMBODIMENT

The present invention relates to polyamide compositions containing carbon black and copper phthalocyanine pigment wherein the amount of pigment is less than about 200 percent by weight of the carbon black. Preferably the copper phthalocyanine pigment utilized for the practice of the present invention is of the $\alpha$ or $\beta$ crystalline form.

As used herein, "copper phthalocyanine" shall mean to include all of the polymorphic crystalline forms of copper phthalocyanine and blends of such forms. A complete description of copper phthalocyanine pigment and the various crystalline forms can be found in *Analytical Chemistry of Synthetic Dyes*, editor K. Van Kataraman, J. Wiley & Sons (1977), at pages 288–298 which is incorporated herein by reference.

Polyamides which may be employed in the practice of the present invention are commonly known as Nylons and include, but are not limited to, nylon 6 or poly(caprolactam), nylon 11 or poly(11-aminoundecanoic acid), nylon 12 or poly(lauryl lactam) or poly(12-aminododecanoic acid), nylon 6,6 or poly(hexamethylene adipamide), nylon 6,9 or poly(hexamethylene azelamide) or poly(hexamethylene nonandiamide), nylon 6,10 or poly(hexamethylene sebacamide) or poly(hexamethylene decanediamide), nylon 6,12 or poly(hexamethylene dodecanoamide) or nylon 4 or poly($\delta$-butyrolactam), nylon 7 or poly(7-aminoheptanoic acid) or poly(7-aminooenanthylic acid), nylon 8 or poly(8-aminocaprylic acid) or poly(8-aminooctanoic acid), nylon 10,6 or poly(decamethylene adipamide) and numerous partially aromatic nylons (PARNs). PARNs result when an aromatic residue or unit is substituted in whole or in part for an aliphatic residue or unit in an aliphatic nylon polymer. For example, substitution of all of the adipic acid [HOOC—(CH$_2$)$_4$—COOH] residues in nylon 6,6 by those from mixtures of about 50–70% terephthalic acid (TA, or p-HOOC—C$_6$H$_5$—COOH)/-50–30% isophthalic acid (IA, or m-HOOC—C$_6$H$_5$—COOH) gives suitable PARNs which are high-melting, partly crystalline nylons 6,TA-co-6, IA or poly(hexamethylene tere-co-isophthalamides). Other suitable PARNs are partly crystalline nylons 6,6-co-6,-TA, nylons 6,6-co-6,IA, nylons 6,6-co-6,-TA-co-6,IA, and other similar PARNs, including partly crystalline PARNs wherein some or all of the diamine residues have aromatic character and those containing lactam residues, such as nylons 6-co-6,6-co-6,TA.

Also suitable are various types of copolyamides, block copolymers, and graft copolymers.

As discussed above, it has been found that the incorporation of carbon black colorant into polyamide compositions reduces the toughness of the final molded product. It has been suggested that this reduction in toughness is due to poor carbon black particle dispersion, particle agglomerations or large particle size, with the result being the creation of stress points within the molded part.

Furthermore, it is believed that carbon black materials produce a highly undesirable form of crystalline nucleating in the final molded nylon products which is actually responsible for the reduction in molded toughness. It should be noted that the above discussions are only directed to theories of how toughness is reduced and should not be taken in any manner so as to limit the scope of the present invention.

In preparing polyamide compositions containing carbon black and copper phthalocyanine pigment, it was determined that the maximum amount of the copper phthalocyanine pigment necessary to impart the improved properties of the final molded part is about 200 percent by weight of the carbon black, preferably from about 0.5 to about 20 percent by weight, more preferably from about 0.5 to about 10 percent by weight and, still more preferably, from about 1 to about 5 percent by weight. A molded part prepared using the composition of the present invention has improved toughness as demonstrated by the improved Izod Impact and elongation at fail for the examples listed below.

While all of the crystalline forms of copper phthalocyanine pigment in general are useful for the practice of the present invention, the preferred pigments are the $\alpha$ and $\beta$ crystalline forms.

With respect to the amount of carbon black present in the final molding composition, it should be noted that carbon black is usually present in small amounts as a colorant. Carbon black may also be utilized at higher amounts, typically at two weight percent loadings, in order to stabilize the resulting molding composition against ultra-violet radiation by minimizing the absorption of light. Accordingly, the amount of carbon black utilized in accordance with the present invention should not be in excess of 10 percent by weight of the final molding composition. Preferably, the amount of carbon black used should be from about 0.2 to about 2 percent by weight of the final molding composition.

The copper phthalocyanine pigment and carbon black may be incorporated into the polyamide resin by any appropriate means so long as when a molding is made from the mixture it will possess the desired impact properties. One such method involves dry blending the carbon black, copper phthalocyanine pigment and polyamide resin (which is in the form of dry pellets) and then extruding and pelletizing this dry blended mixture. The resulting pellets may then be molded by any appropriate technique such as injection molding.

EXAMPLE 1-45

The following Examples were prepared to demonstrate various properties of moldings made from polyamide compositions in accordance with the present invention. All of the Examples were prepared by the same procedure using nylon 6,6 polymer (poly[hexamethylene adipamide]) with the amounts of carbon black colorant (expressed as percent by weight [%-wt]) and copper phthalocyanine pigment (expressed as percent by weight of the carbon black [%-wt CB]) present in the composition of each example listed below in Table I. The examples were prepared using, unless otherwise indicated, a 25% by weight dispersion of carbon black in a nylon 6 carrier sold by Ciba-Geigy Corporation, a subsidiary of Ciba-Geigy Ltd., Basle, Switzerland (product designation D-8790) and the $\alpha$-crystalline form of the copper phthalocyanine pigment sold as a dry powder by Ciba-Geigy (product designation X-3228).

All of the examples were prepared by dry blending the appropriate amounts of nylon 66, carbon black colorant concentrate and copper phthalocyanine pigment. This was accomplished by physically blending the materials in a drum tumbler for about 20 minutes. Both the nylon 66 and the carbon black colorant concentrate were dried previous to the dry blending by drying at 200° F. for about 6 hours in a laboratory vacuum drier which will tumble the material to be dried in an inert atmosphere such as an Abbe drier.

The physically blended mixture of each example was then compounded by an extrusion process. This involved feeding the physically blended mixture into a Sterling Single Stage Extruder possessing a Mailefer mixing screw (1½ inches in diameter by 36 inches long) which was rotated from about 100 to about 140 revolutions per minute (RPM). The rear zone of the extruder was heated to 260°-265° C. with the middle and rear zones heated to 280°-290° C. The extruder was connected to a die with a single ⅛ inch diameter orifice through a 60-100-60 screen pack. The die was heated to 275° C. The extruded material was passed through a water bath and pelletized by a Cumberland (Model 6) Pelletizer. The rate of extrusion was 35-42 pounders per hour.

The pelletized compounded material of each example was then injection molded into specimen bars for testing according to the procedures as set forth below with the testing results concurrently listed for each example in Table I. The injection molding was conducted using a 10 ounce—175 ton New Britain Molding machine possessing a general purpose screw with a check ring and a straight through nozzle. The molding conditions were as follows:
1. Temperatures:
    Rear Zone 270° C.
    Center Zone 295° C.
    Front Zone 295° C.
    Nozzle 295° C.
    Mold 93° C.
2. Screw Speed: 103 rpm
3. Injection Rate: 1 sec
4. Hold and Cooling Times: 15 seconds
5. Hydraulic Pressures:
    Injection 850 pounds/inch$^2$ (psi)
    Hold 750 psi
    Back 0-100 psi

TEST PROCEDURES (1) Tensile Elongation at Fail (toughness measure using dumbbell shaped specimen bar having cross-sectional dimensions of ⅛ inch thick by ½ inch wide)—American Society for Testing and Materials (ASTM) Test method D-638. Measurements in percentage (%). (Sample tested Dry-As-Molded).

(2) Mold Shrinkage (⅛ inch thick×½ inch wide×5 inches long specimen bar)—ASTM Test method D-955. Measurements in mils/inch. (Samples measured Dry-As-Molded).

(3) Izod Impact (⅛ inch thick×½ inch wide×5 inches long specimen bar cut into 2½ inch long bars to provide two pieces for testing: Gate end (GE) the piece closest to gate and the dead end (DE)—ASTM Test method D-256 using a machined 0.010 inch notch in bar. Measurements in foot-pounds/inch (ft-lb/in). (Samples tested Dry-As-Molded).

The improvement in toughness property is evaluated directly from examination of the Izod impact as well as the Elongation at Fail. It is well accepted in the art that overall toughness of plastic materials increases as tensile elongation increases at Fail. Specifically, tensile elongation measures the work required to break or fracture a plastic molding which directly correlates to toughness.

TABLE I

| Example No. | Carbon Black % - wt | Cu—Phthalocyanine % - wt CB | Izod Impact (ft-lbs/in) GE | Izod Impact (ft-lbs/in) DE | Mold Shrinkage mils/inch | Elongation at Fail % |
|---|---|---|---|---|---|---|
| 1 | 2 | 0 | | | 13 | 35 |
| 2 | 2 | 1 | | | 15.3 | 52 |
| 3 | 2 | 1.5 | | | 16.7 | 53 |
| 4 | 2 | 2 | | | 17.3 | 47 |
| 5 | 2 | 2.5 | | | 17.3 | 59 |
| 6 | 2 | 3 | | | 17.9 | 51 |
| 7 | 2 | 4 | | | 18.4 | 41 |
| 8 | 2 | 5 | | | 18.2 | 49 |
| 9 | 2 | 1.5[b] | | | 17.0 | 51 |
| 10 | 2 | 1.5[c] | | | 17.2 | 38 |
| 11 | 2 | 1.5[d] | | | 17.2 | 41 |
| 12 | 2[a] | 1.5 | | | 15.7 | 41 |
| 13 | 2 | 0 | 1.0 | 0.90 | 13.2 | 45 |
| 14 | 2 | 5 | 1.25 | 1.08 | 18.5 | 46 |
| 15 | 2 | 10 | 1.16 | 0.96 | 16.2 | 33 |
| 16 | 2 | 20 | 1.0 | 0.79 | 14.2 | 33 |
| 17 | 0.5 | 0 | 1.04 | 0.82 | 13.2 | 44 |
| 18 | 0.5 | 2 | 1.18 | 0.93 | 18.0 | 51 |
| 19 | 0.5 | 4 | 1.08 | 1.07 | 18.7 | 57 |
| 20 | 0.5 | 20 | 1.03 | 0.92 | 18.6 | 45 |
| 21 | 0.5 | 40 | 1.08 | 0.93 | 18.0 | 33 |
| 22 | 0.5 | 80 | 1.03 | 0.80 | 16.6 | 39 |
| 23 | 0.05 | 0 | 0.98 | 0.86 | 17.2 | 55 |
| 24 | 0.05 | 2 | 1.13 | 0.86 | 18.2 | 75 |
| 25 | 0.05 | 4 | 1.21 | 0.94 | 18.5 | 62 |
| 26 | 0.05 | 20 | 1.13 | 0.98 | 18.8 | 73 |
| 27 | 0.05 | 40 | 1.09 | 0.92 | 18.6 | 64 |
| 28 | 0.05 | 80 | 1.18 | 0.96 | 18.6 | 67 |
| 29 | 0.05 | 200 | 1.09 | 0.93 | 18.7 | 56 |
| 30 | 2 | 0 | 0.99 | 0.84 | 12.8 | 33 |
| 31 | 2 | 0.25 | 0.98 | 0.84 | 13.0 | 42 |
| 32 | 2 | 0.5 | 0.95 | 0.81 | 13.6 | 45 |
| 33 | 2 | 1.0 | 1.0 | 0.87 | 14.6 | 41 |
| 34 | 2 | 2.0 | 1.05 | 0.99 | 16.7 | 51 |
| 35 | 2 | 5 | 1.23 | 1.00 | 18.0 | 48 |
| 36 | 2 | 10 | 1.12 | 0.90 | 16.6 | 39 |
| 37 | 2 | 20 | 0.97 | 0.72 | 13.4 | 36 |
| 38 | 0.2 | 0 | 1.01 | 0.79 | 14.6 | 54 |
| 39 | 0.2 | 0.25 | 0.95 | 0.82 | 15.0 | 51 |
| 40 | 0.2 | 0.5 | 1.15 | 0.79 | 16.4 | 56 |
| 41 | 0.2 | 1.0 | 1.0 | 0.84 | 17.4 | 66 |
| 42 | 0.2 | 2.0 | 1.03 | 0.91 | 18.0 | 68 |
| 43 | 0.2 | 5.0 | 1.11 | 0.88 | 18.2 | 73 |
| 44 | 0.2 | 10 | 1.18 | 0.99 | 19.5 | 63 |
| 45 | 0.2 | 20 | 1.16 | 0.97 | 18.5 | 63 |

[a] A 40% by weight dispersion of carbon black in a terpolymer of nylon 6, nylon 12 and nylon 66 manufactured by Emser Industries, Inc. The dispersion was prepared by Polymer Concentrates (product designation PC-90420).
[b] The β-crystalline form of Cu—phthalocyanine sold as a dry powder by Ciba-Geigy (product designation X-2925).
[c] A 25% by weight dispersion of the α-crystalline form of Cu—phthalocyanine in nylon 6 sold by Ciba-Geigy (product designation D-8770).
[d] A 25% by weight dispersion of the α-crystalline form of Cu—phthalocyanine in an olefin carrier sold by Ciba-Geigy (product designation D-8503).

It can be seen from the above examples that the use of copper phthalocyanine pigment in amounts of less than about 20 weight percent of the carbon black provide the resulting molding prepared using the composition of the present invention with improved impact properties. This is especially exemplified by the property of elongation at fail wherein for the most part the compositions containing less than about 200 weight percent copper phthalocyanine pigment and preferably from about 0.5 to about 20 weight percent phthalocyanine pigment exhibit improvement in this property. Examples 13–16 which contain 2% wt. carbon black show an improvement in Izod impact. Furthermore, Examples 30–37 which also contain 2% wt. carbon black show an improvement in the property of elongation at fail which increases in a bell shaped curve from 0.25 to 20% wt. phthalocyanine pigment of the carbon black.

While the preferred embodiments of the present invention have been described, various modifications and substitutions may be made thereto without departing from the spirit and scope of the invention. Accordingly, the present invention has been described by way of illustration, not limitation.

What is claimed is:

1. A molding composition comprising: (1) a polyamide resin; (2) a maximum of 10 percent by weight and a minimum of 0.05 percent by weight of the composition of carbon black; and (3) a maximum of about 200 percent by weight and a minimum of 0.25 percent by weight of the carbon black of a copper phthalocyanine pigment.

2. The composition of claim 1 wherein said copper phthalocyanine pigment is in an amount of from about 0.5 to about 10 percent by weight of the carbon black.

3. The composition of claim 1 wherein said copper phthalocyanine pigment is in an amount of from about 1 to about 5 percent by weight of the carbon black.

4. The composition of claim 2 wherein said carbon black is from about 0.2 to about 2 percent by weight of the composition.

5. The composition of claim 3 wherein said carbon black is from about 0.2 to about 2 percent by weight of the composition.

6. The composition of claim 4 wherein said pigment is the α or β crystalline form.

7. The composition of claim 5 wherein said pigment is the α or β crystalline form.

8. The composition of claim 7 wherein said polyamide resin is nylon 6,6.

9. A molded article comprising a polyamide molding material comprised of: (1) a polyamide resin; (2) a maximum of 10 percent by weight and a minimum of 0.05 percent by weight of the composition of carbon black; and (3) a maximum of about 200 percent by weight and a minimum of 0.25 percent by weight of the carbon black of a copper phthalocyanine pigment.

10. The molded article of claim 9 wherein said copper phthalocyanine pigment is in an amount of from about 0.5 to about 10 percent by weight of the carbon black.

11. The molded article of claim 9 wherein the copper phthalocyanine pigment is in an amount of from about 1 to about 5 percent by weight of the carbon black.

12. The molded article of claim 10 wherein said pigment is the α or β crystalline form.

13. The molded article of claim 11 wherein said pigment is the α or β crystalline form.

14. The molded article of claim 13 wherein said polyamide resin is nylon 6,6.

15. The molded article of claim 12 wherein said carbon black is from about 0.2 to about 2 percent by weight of the composition.

16. The molded article of claim 13 wherein said carbon black is from about 0.2 to about 2 percent by weight of the composition.

* * * * *